United States Patent
Chou

(10) Patent No.: US 11,673,779 B2
(45) Date of Patent: Jun. 13, 2023

(54) CARRIER AND MOBILE LIFTING CONVEYOR CONTAINING THE SAME

(71) Applicant: FAROBOT INC., New Taipei (TW)

(72) Inventor: Sheng-Hao Chou, New Taipei (TW)

(73) Assignee: FAROBOT INC., New Taipei (TW)

( * ) Notice: Subject to any disclaimer, the term of this patent is extended or adjusted under 35 U.S.C. 154(b) by 83 days.

(21) Appl. No.: 17/357,667

(22) Filed: Jun. 24, 2021

(65) Prior Publication Data

US 2022/0348445 A1 Nov. 3, 2022

(30) Foreign Application Priority Data

Apr. 29, 2021 (CN) .......................... 202110472609.9

(51) Int. Cl.
| | | |
|---|---|---|
| *B66F 9/06* | (2006.01) | |
| *B66F 9/065* | (2006.01) | |
| *B66F 9/075* | (2006.01) | |
| *B66F 9/20* | (2006.01) | |

(52) U.S. Cl.
CPC .............. *B66F 9/063* (2013.01); *B66F 9/065* (2013.01); *B66F 9/0755* (2013.01); *B66F 9/20* (2013.01)

(58) Field of Classification Search
CPC .......... B66F 9/065; B66F 9/063; B66F 9/061; B66F 9/07
See application file for complete search history.

(56) References Cited

U.S. PATENT DOCUMENTS

| | | | | |
|---|---|---|---|---|
| 5,525,884 | A * | 6/1996 | Sugiura | G05D 1/0263 318/587 |
| 2016/0209847 | A1* | 7/2016 | Kuegle | B66F 9/063 |
| 2021/0061629 | A1* | 3/2021 | Ogawa | B66F 9/0755 |
| 2021/0331542 | A1* | 10/2021 | Ye | B60G 3/14 |
| 2022/0041415 | A1* | 2/2022 | Lilley | G05D 1/0225 |

FOREIGN PATENT DOCUMENTS

| | | | |
|---|---|---|---|
| CN | 105593143 A | 5/2016 | |
| CN | 205602585 U | 9/2016 | |
| CN | 107444813 A | 12/2017 | |
| CN | 209396395 | * 12/2018 | ............. B65G 13/07 |
| CN | 210048043 U | 2/2020 | |
| CN | 210943578 U | 7/2020 | |
| CN | 211001056 U | * 7/2020 | |
| CN | 111824744 A | 10/2020 | |

* cited by examiner

*Primary Examiner* — Kaitlin S Joerger

(74) *Attorney, Agent, or Firm* — ScienBiziP, P.C.

(57) ABSTRACT

A carrier for transporting goods includes a supporting mechanism, a lifting mechanism, a first detection component, and a controller. The supporting mechanism includes at least one entrance and connected to a mobile robot. The lifting mechanism includes a lifting driving member and a bearing part. The lifting driving member is arranged on the supporting mechanism, and the bearing part is arranged on the lifting driving member to be driven to be elevated or lowered by the lifting driving member. The first detection component is arranged on the bearing part and is located in front of the at least one entrance for detecting a position of the goods. The controller is arranged on the supporting mechanism and is respectively communicatively connected with the lifting driving member, the first detection component, and the mobile robot. A mobile lifting conveyor having the carrier is also provided.

16 Claims, 9 Drawing Sheets

CARRIER AND MOBILE LIFTING CONVEYOR CONTAINING THE SAME

FIELD

The subject matter herein generally relates to pallets to a field of transportation, and more particularly, to a carrier and a mobile lifting conveyor containing the carrier.

BACKGROUND

Autonomous mobile robots have been widely used, for example, in logistics handling and picking. When moving goods, the autonomous mobile robot firstly lifts the goods and then moves to a designated location according to a planned route, and then uses a stacker to lift the goods at different heights to adapt to the placement of the goods on different platforms. The stacker requires manual operation, and the autonomous mobile robot needs to cooperate with the stacker to move the goods. The above handling method is lack of practicing automation.

Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
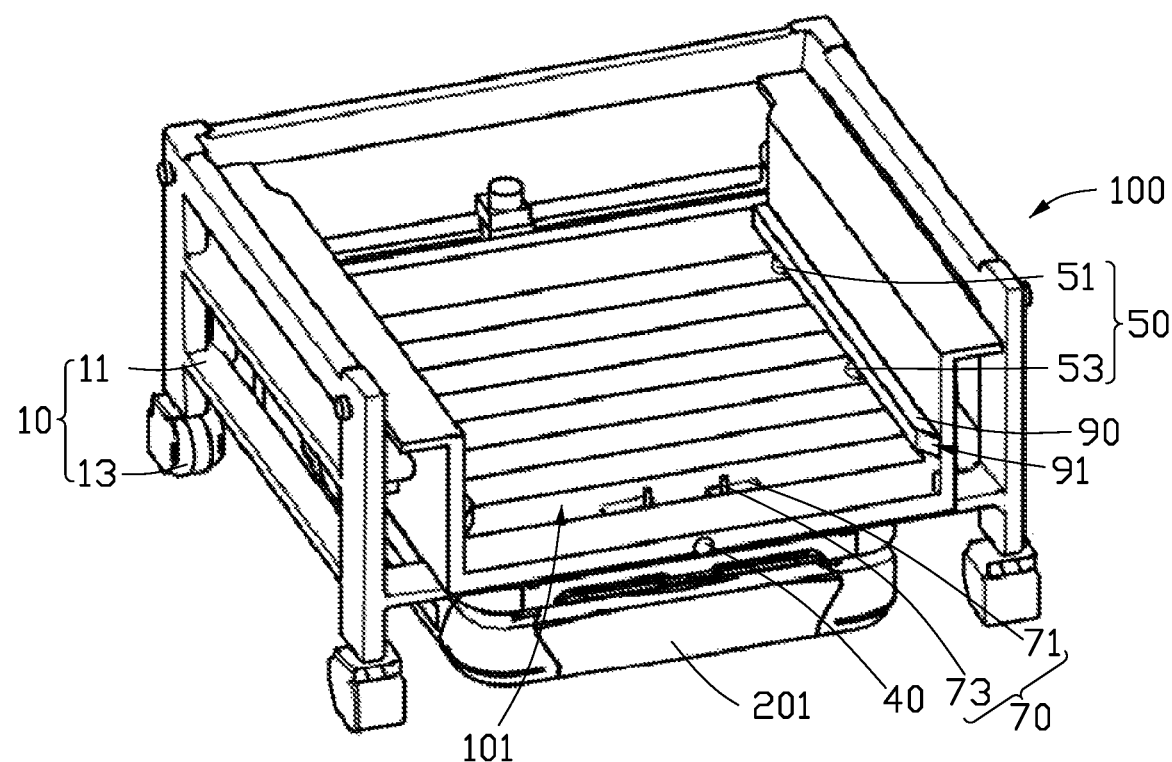
FIG. 1 is a structural schematic diagram of an embodiment of a mobile lifting conveyor from a first perspective according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

An embodiment of a carrier includes a supporting mechanism, a lifting mechanism, a first detection component, and a controller. The supporting mechanism includes at least one entrance and connects a mobile robot. The lifting mechanism includes a lifting driving member and a bearing part. The lifting driving member is arranged on the supporting mechanism, and the bearing part is arranged on the lifting driving member. The lifting driving member is used for driving the bearing part to be elevated or lowered. The first detection component is arranged on the bearing part and located in front of the entrance for detecting a position of goods to be transported. The controller is arranged on the supporting mechanism, and is respectively communicatively connected with the lifting driving member, the first detection component, and the mobile robot.

The carrier is installed on the mobile robot and driven to move by the mobile robot. The carrier obtains a height of a platform for placing the goods through the first detection component and feeds the height back to the controller. The controller controls the lifting driving member to drive the bearing part to be elevated by an appropriate displacement, so that the goods may be transferred smoothly between the bearing part and the platform. After the transfer is completed, the controller controls the lifting driving member to drive the bearing part to back to the original position. The lifting driving member can drive the bearing part to move different displacements to adapt to the loading of the goods placed on the platforms at different heights without using a stacker, thereby realizing automated cargo handling.

Figure 2:
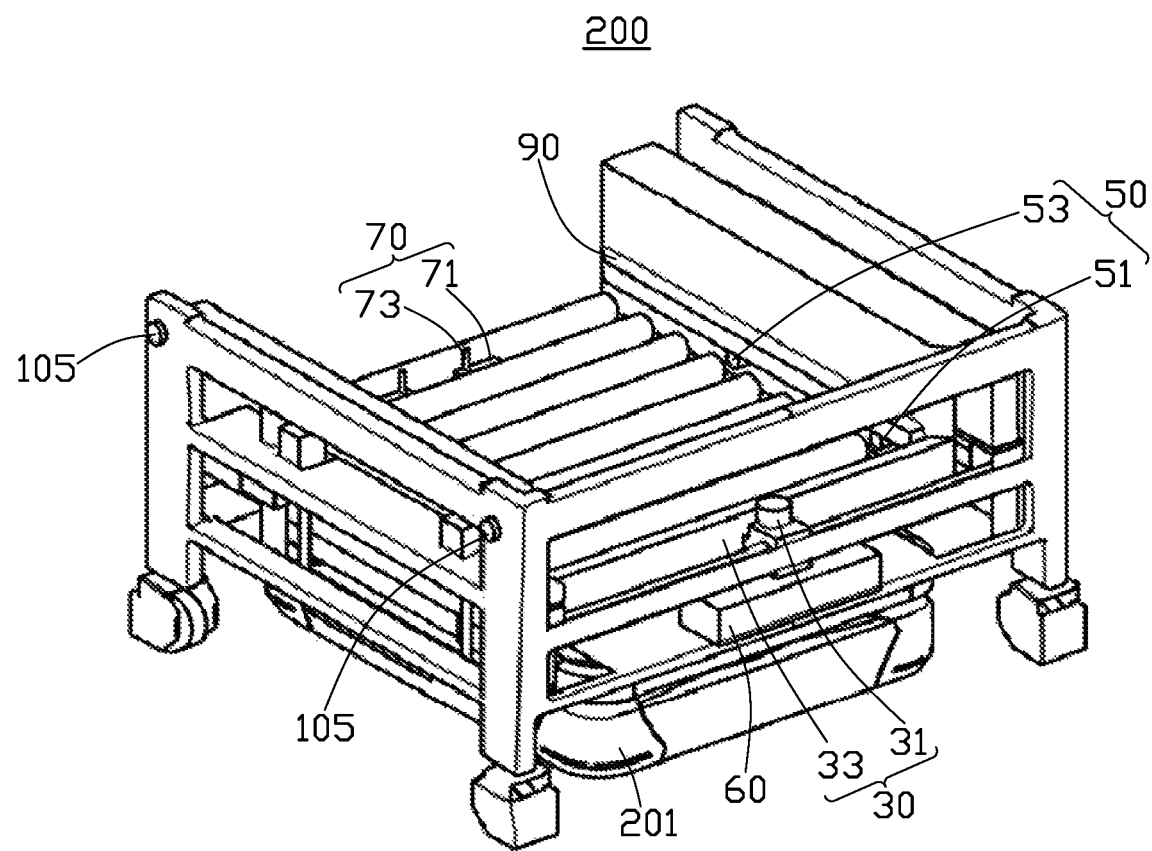
FIG. 2 is a structural schematic diagram of the mobile lifting conveyor of FIG. 1 from a second perspective.
Figure 3:
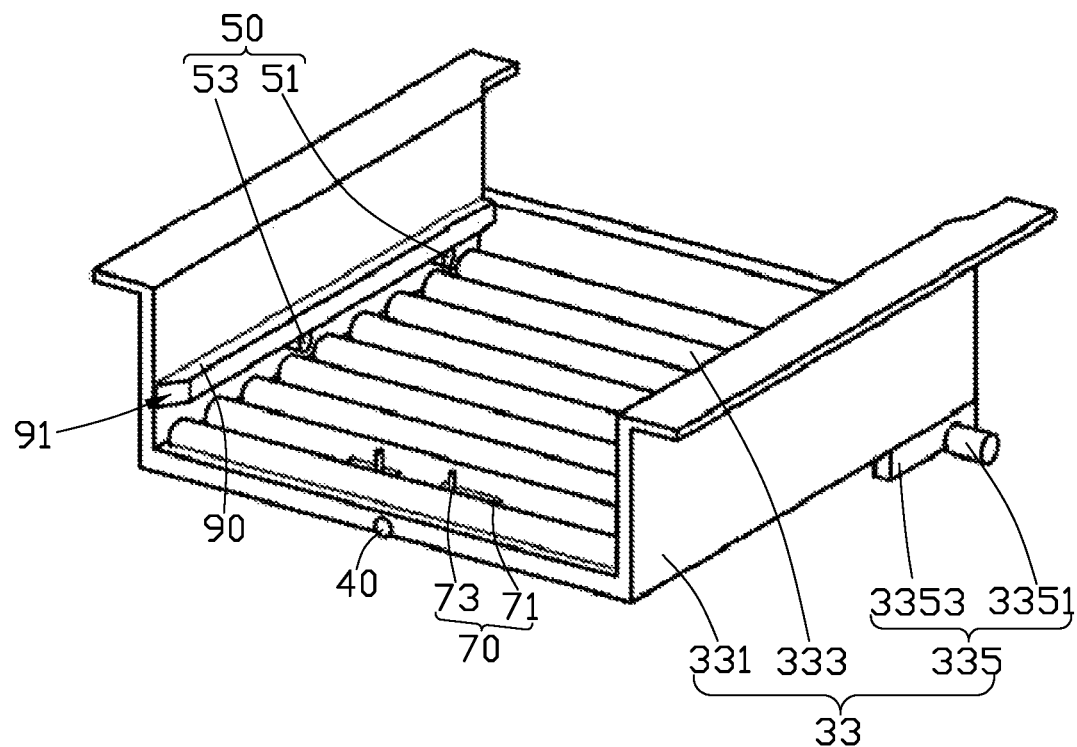
FIG. 3 is a structural schematic diagram of a carrier of the mobile lifting conveyor of FIG. 1 without a supporting mechanism and a lifting driving member.

FIGS. 1 to 3 illustrate an embodiment of a mobile lifting conveyor 200. The mobile lifting conveyor 200 includes a carrier 100 for carrying goods 400 and a mobile robot 201. The goods 400 may include, but is not limited to, a pallet and equipment placed on the pallet. For example, in other embodiments, the carrier 100 may also directly carry other goods such as equipment. The carrier 100 includes a supporting mechanism 10, a lifting mechanism 30, a first detection component 40, and a controller 60. The supporting mechanism 10 includes at least one entrance 101. The goods 400 may enter from the entrance 101 to be carried on the carrier 100. The supporting mechanism 10 may be connected to the mobile robot 201, so that the carrier 100 may be applied in the mobile lifting conveyor 200. The lifting mechanism 30 includes a lifting driving member 31 and a bearing part 33. The lifting driving member 31 is arranged on the supporting mechanism 10, and the bearing part 33 is arranged on the lifting driving member 31. The lifting driving member 31 is used for driving the bearing part 33 to be elevated or lowered. The first detection component 40 is arranged on the bearing part 33 and located in front of the entrance 101 for detecting a position of the goods 400 to be transported. For example, the first detection component 40 detects a height of a platform 300 for placing the goods 400. The controller 60 is arranged on the supporting mechanism 10, and is respectively communicatively connected with the lifting driving member 31, the first detection component 40, and the mobile robot 201.

In at least one embodiment, the mobile robot 201 may include multiple functions such as environment perception, dynamic decision and planning, behavior control and execution. The mobile robot 201 may be, but is not limited to, autonomous mobile robot (shorted as AMR) or automated guided vehicle (shorted as AGV).

Figure 7:
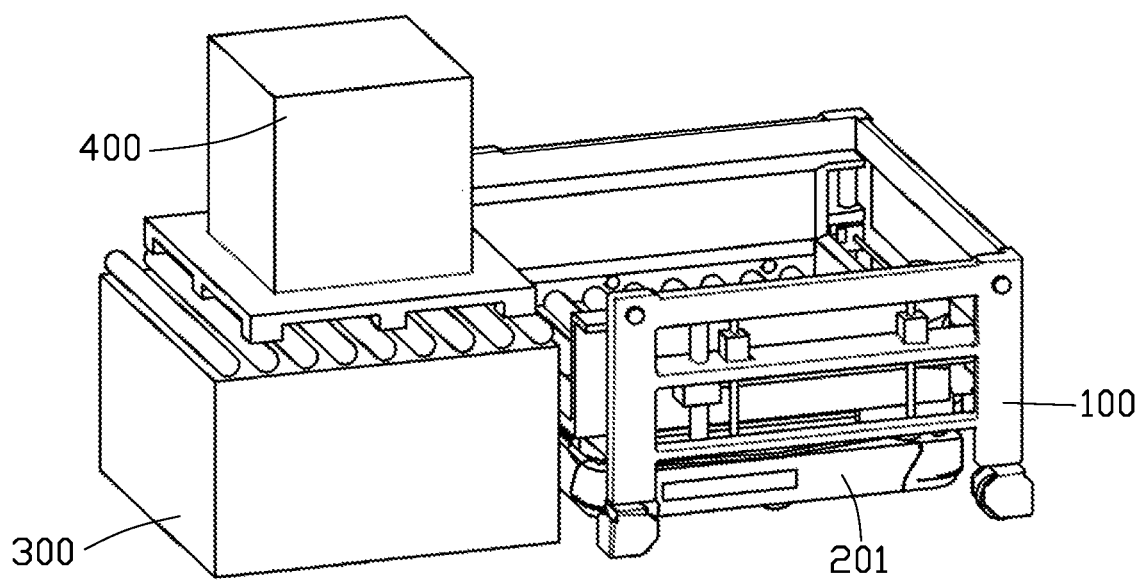
FIG. 7 is a diagram of a first state of the mobile lifting conveyor of FIG. 1 when carrying goods.
Figure 8:
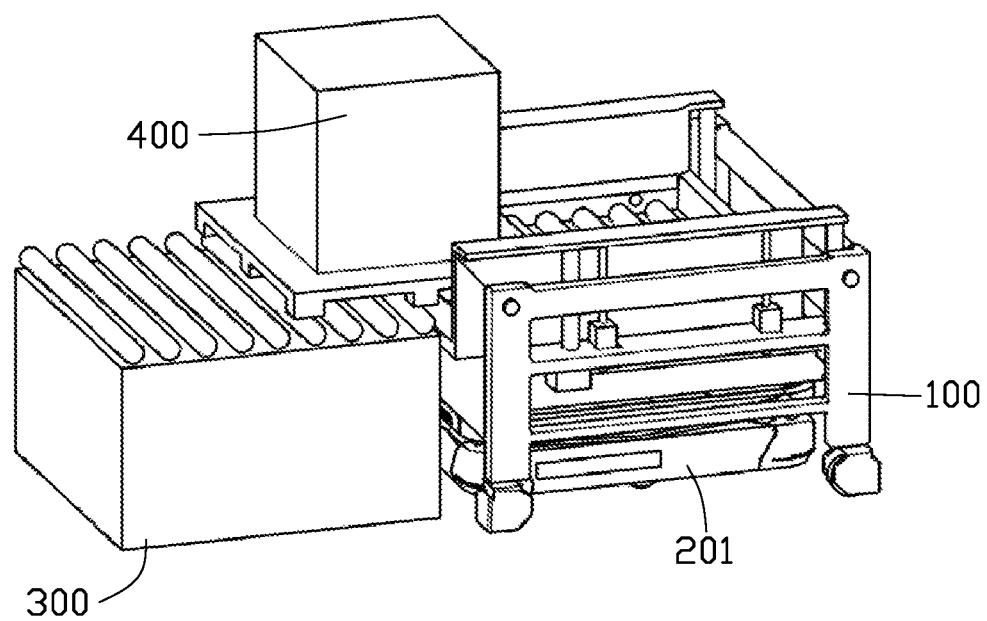
FIG. 8 is a diagram of a second state of the mobile lifting conveyor of FIG. 1 when carrying goods.
Figure 9:
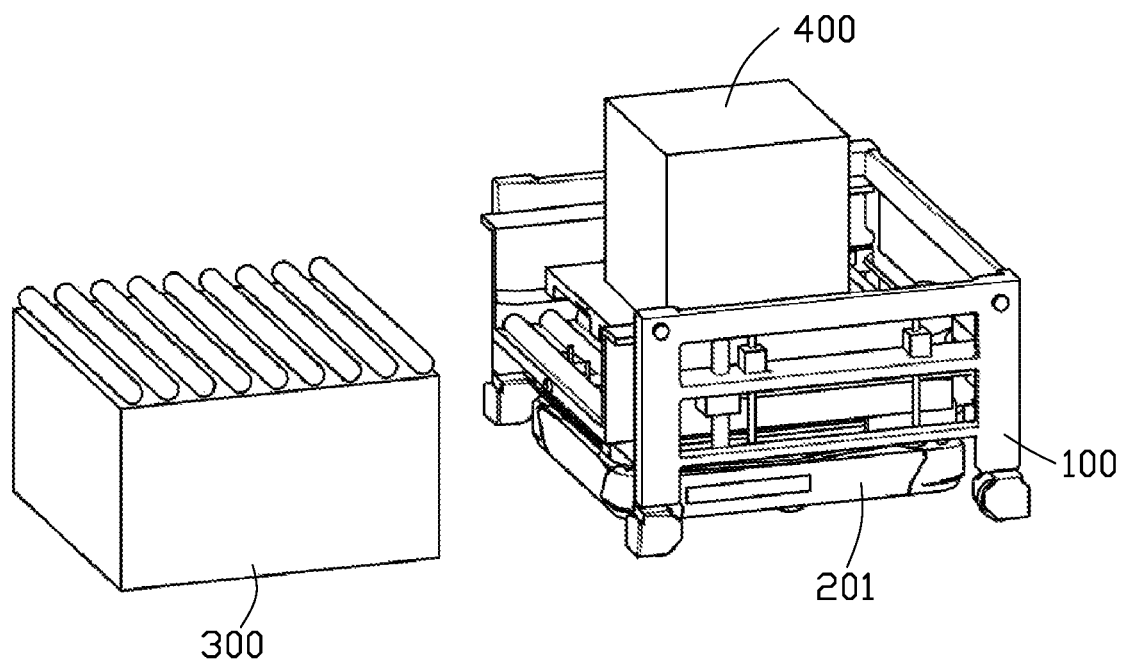
FIG. 9 is a diagram of a third state of the mobile lifting conveyor of FIG. 1 when carrying goods.

Referring to FIGS. 7 to 9, when transporting the goods 400, the goods 400 are picked up at a transportation point and sent to a destination. Referring to FIG. 7, the goods 400 are placed on a platform 300 at the transportation point. Specifically, the mobile robot 201 drives the carrier 100 to move to the transportation point according to a planned route. When the mobile robot 201 moves to a preset distance from the transportation point, the controller 60 controls an operation of the first detection component 40 to measure a height of the platform 300 placing the goods 400. Referring to FIG. 8, the controller 60 controls the lifting driving member 31 to drive the bearing part 33 to be elevated by an appropriate displacement according to the measured height. For example, in at least one embodiment, the bearing part 33 may be elevated until the top of the bearing part 33 is coplanar with the platform 300, so that the goods 400 may enter smoothly from the entrance 101 to the bearing part 33. Referring to FIG. 9, after all the goods 400 are carried on the bearing part 33, the controller 60 controls the lifting drive 31 to drive the bearing part 33 to fall back. When the bearing part 33 falls back to the original position, the controller 60 communicates with the mobile robot 201, and the mobile robot 201 drives the carrier 100 to move to the destination. The controller 60 controls the first detection component 40 to measure a height of another platform (not shown) at the destination, and the controller 60 controls the lifting driving member 31 to drive the bearing part 33 to be elevated by a suitable displacement, so that the goods 400 may steadily move from the entrance 101 to the another platform. When the goods 400 are loaded on the another platform, the controller 60 controls the lifting driving member 31 to drive the bearing part 33 down to return to the original position. The pickup, transportation and delivery of the cargo 400 are completed.

The carrier 100 is installed on the mobile robot 201 through the supporting mechanism 10, and the mobile robot 201 may drive the carrier 100 to move at the transportation location (between the transportation point and destination) of the goods 400. The carrier 100 acquires the information of height of the platform 300 for placing the goods 400 by the first detection component 40 and feeds the height back to the controller 60. The controller 60 controls the lifting driving member 31 to drive the bearing part 33 to be elevated by an appropriate displacement from the original position, so that the goods 400 may be transferred smoothly between the bearing part 33 and the platform 300. After the transfer is completed, the controller 60 controls the lifting driving member 31 to drive the bearing part 33 to back to the original position. The lifting driving member 31 can drive the bearing part 33 to move different displacements to adapt to the loading of the goods 400 placed on the platforms 300 at different heights without using a stacker (not shown), so that the goods 400 are automatically moved.

In at least one embodiment, the first detection component 40 is a photoelectric sensor, but is not limited thereto. For example, in other embodiments, the first detection element 40 may also be a digital sensor, an optical fiber sensor, an ultrasonic sensor, or the like.

Referring to FIG. 2, the carrier 100 may further include a second detection component 50. The second detection component 50 is used to detect the contact between the goods 400 and the bearing part 33. In at least one embodiment, the second detection component 50 includes a first sensing element 51 and a second sensing element 53. The first sensing element 51 and the second sensing element 53 are arranged on the bearing part 33 at intervals. The first sensing element 51 is located on a side of the second sensing element 53 away from the entrance 101. The first sensing element 51 and the second sensing element 53 respectively communicate with the controller 60. When the first sensing element 51 is in contact with the goods 400, the goods 400 has been completely carried on the bearing part 33, and at this time, the goods 400 is also in contact with the second sensing element 53. The first sensing element 51 feeds back a signal that the first sensing element is in contact with the goods 400 to the controller 60. The controller 60 feeds back the signal transmitted from the goods 400 to the bearing part 33 to the mobile robot 201, and the mobile robot 201 drives the carrier 100 to move to carry out the transportation operation of the goods 400. When the goods are unloaded from the carrier 100, most of the load of the goods 400 are carried on the platform 300, the goods 400 are separated from the second sensing element 53, and the bearing part 33 is separated from the goods 400, and the goods 400 will not be dumped. When the goods 400 move to a safe position, the second sensing element 53 feeds back a signal that the second sensing element is separated from the goods 400 to the controller 60. The controller 60 controls the lifting driving member 31 to drive the bearing part 33 to descend back to the original position.

The first sensing element 51 may feed back the signal of all the goods 400 carried on the bearing part 33 to the controller 60. The mobile robot 201 acquires the signal through the controller 60 and starts to drive the carrier 100 to move, which further increases the automation of the transportation. The second sensing element 53 may feed back the signal that the goods 400 move to the safe position when leaving the bearing part 33 to the controller 60, and the controller 60 then controls the lifting driving member 31 to drive the bearing part 33 back, which further increases the automation of the transportation, the efficiency of the transportation, and the safety of the transportation.

The first sensing element 51 and the second sensing element 53 have the same structure, and both are contact sensors, but are not limited thereto. For example, in other embodiments, the first sensing element 51 and the second sensing element 53 may also be photoelectric sensors. When the goods 400 are moved to be completely carried on the bearing part 33, the first sensing element 51 senses a mark on the goods 400 and feeds back a signal to the controller 60. When most of the load of the goods 400 (sch as two thirds of area of a bottom of the goods 400) are separated from the bearing part 33, a displacement of the goods 400 is equal to a distance between the second sensing element 53 and the first sensing element 51, and the second sensing element 53 senses the mark and feeds back the signal that the goods 400 move to the safe position to the controller 60.

Referring to FIG. 3, the bearing part 33 includes a carrying main body 331, a conveying driving member 335, and a plurality of rollers 333. The plurality of rollers 333 are rotatably carried on the carrying main body 331 and are connected with the conveying driving member 335. The conveying driving member 335 is disposed on the carrying main body 331 and drives the plurality of rollers 333 to roll. The rollers 333 provide movement guidance for the goods 400. Specifically, the conveying driving member 335 includes a rotating driving portion 3351 and a connecting assembly 3353. The rotating drive portion 3351 is arranged on the carrying main body 331. The connecting assembly 3353 is arranged on the rotating driving portion 3351 and is respectively engaged with the plurality of rollers 333. The rotating driving portion 3351 is used to drive the connecting assembly 3353 to move and drive the plurality of rollers 333 to rotate. In at least one embodiment, the connecting assembly 3353 may be an assembly including at least one sprocket and at least one chain, but is not limited to thereto. For example, in at least one embodiment, the connecting assembly 3353 may be an assembly including at least one synchronous pulley and at least one synchronous belt. The rotating driving portion 3351 may be a motor or a rotating cylinder. The sprocket or the synchronous pulley is connected with the rotating driving portion 3351. The chain or the synchronous belt is respectively engaged with the plurality of rollers 333. The rotating driving portion 3351 drives the sprocket or the synchronous pulley to rotate to drive the chain or the synchronous belt, so that the chain or the synchronous belt drives the plurality of rollers 333 to rotate. The plurality of rollers 333 drives the goods 400 to move on the bearing part 33 so that the automated transfer of the goods 400 between the bearing part 33 and the platform 300 may be achieved.

Referring to FIGS. 1 and 3, the carrier 100 may further include a protection mechanism 70. In at least one embodiment, the number of the protection mechanisms 70 may be two. Each protection mechanism 70 includes a moving driver 71 and a stopper 73. The moving driver 71 is arranged on the bearing part 33 and is communicatively connected with the controller 60. The stopper 73 is arranged on the moving driver 71 and is located on a side of the bearing part 33 facing the entrance 101. The stopper 73 is driven to be elevated or lowered by the moving driver 71 and prevents the goods 400 on the bearing part 33 from coming out of the entrance 101. When the goods are completely carried on the bearing part 33, the controller 60 controls the moving driver 71 to drive the stopper 73 to be elevated, so that the stopper 73 protrudes from a top of the bearing part 33. The goods 400 are stopped by the stopper 73 and will not be dumped. When the goods 400 are taken from the platform 300 to the bearing part 33 and unloaded from the bearing part 33, the controller 60 controls the moving driver 71 to drive the stopper 73 to be lowered. The whole of the stopper 73 is located below the top of the bearing part 33, and the stopper 73 will not affect the movement of the goods 400.

The moving driver 71 may be an air cylinder or an electric cylinder.

Each protection mechanism 70 communicates with the controller 60 through the moving driver 71, so that the protection of the goods 400 by the carrier 100 is automated, and the safety of the carrier 100 is improved. In at least one embodiment, the protection mechanism 70 may also be omitted.

Figure 4:
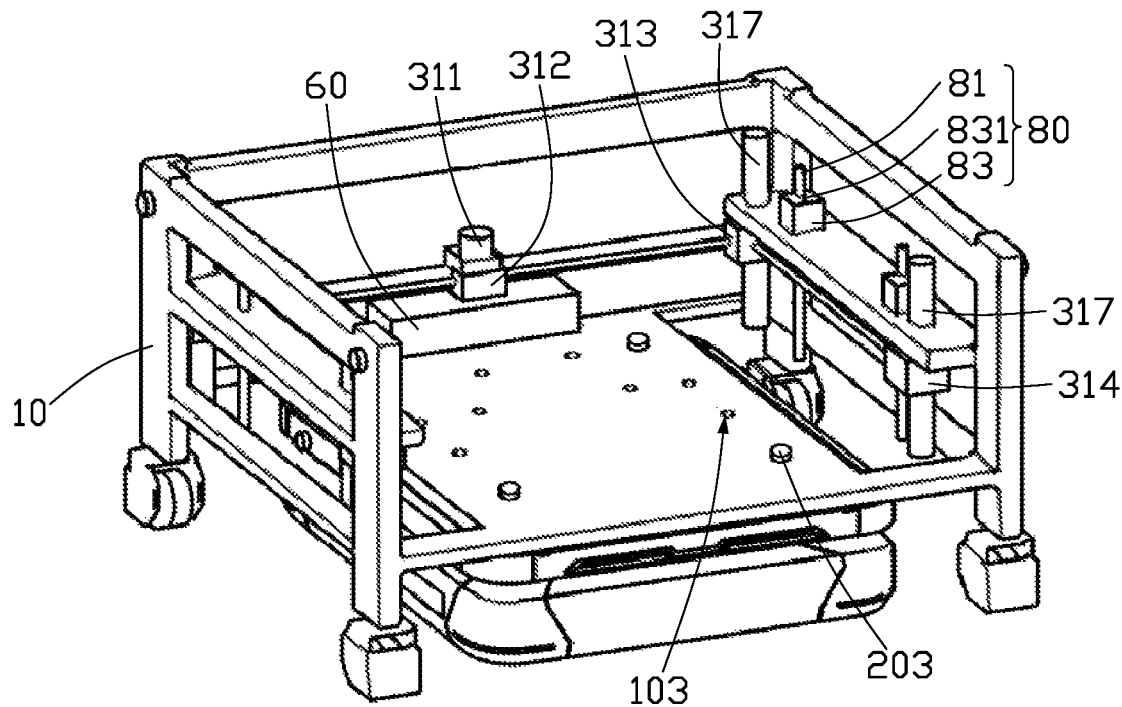
FIG. 4 is a structural schematic diagram of a carrier of the mobile lifting conveyor of FIG. 1 without a bearing part.
Figure 5:
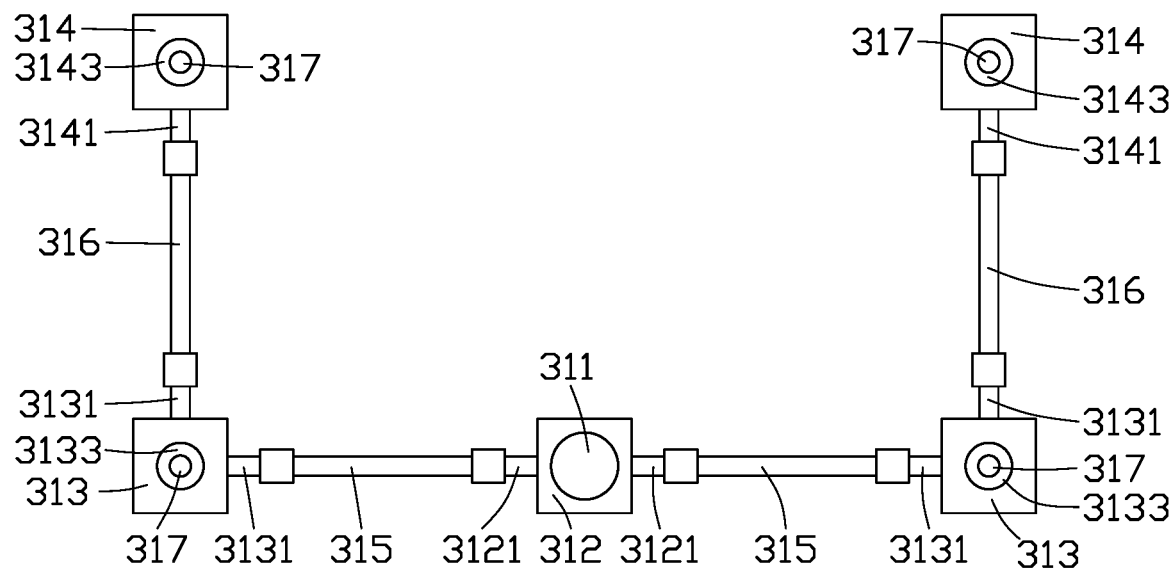
FIG. 5 is a structural schematic diagram of a lifting driving member of a carrier of the mobile lifting conveyor of FIG. 1.

Referring to FIGS. 2, 4 and 5, the lifting driving member 31 may include a rotating driver 311, a first speed reducer 312, two second speed reducers 313, two third speed reducers 314, two first connecting rods 315, two second connecting rods 316, and four screw rods 317. The first speed reducer 312, the second speed reducers 313, and the third speed reducers 314 are arranged on the supporting mechanism 10 at intervals and are located on a peripheral side of the bearing part 33. In at least one embodiment, the first speed reducer 312 may be located on the side of the bearing part 33 away from the entrance 101. The second speed reducers 313 are symmetrically arranged on opposite sides of the bearing part 33 between the entrance 101 and the side of the bearing part 33 away from the entrance 101. The third speed reducers 314 are symmetrically arranged on the s opposite sides of the bearing part 33 between the entrance 101 and the side of the bearing part 33.

Two first shafts 3121 are connected to opposite sides of the first speed reducer 312. The rotating driver 311 is connected to the first speed reducer 312 to drive the first shafts 3121 to rotate synchronously. Two of the screw rods 317 are arranged on the bearing part 33 at intervals and are respectively screwed to one of the second speed reducers 313. Specifically, each second speed reducer 313 screwed to the screw rod 317 includes a first nut 3133 adapted to the screw 317. Two second shafts 3131 are connected to each of the second speed reducers 313, and the extension directions of the second shafts 3131 intersect.

Two opposite ends of each of the first connecting rods 315 are respectively connected to one of the first shafts 3121 and the second shaft 3131 adjacent to the first shaft 3121 without rotation, so that the first shaft 3121 and the adjacent second shaft 3131 rotate synchronously. The first shaft 3121 drives the second shaft 3131 to drive the first nut 3133 to rotate, the first nut 3133 is engaged with the screw rod 317 for transmission. So that the bearing part 33 is driven to be elevated or lowered by the screw rod 317.

The other two of the screw rods 317 are arranged on the bearing part 33 at intervals and are respectively screwed to one of the third speed reducers 314. Specifically, each third speed reducer 314 screwed to the screw rod 317 includes a second nut 3143 adapted to the screw 317. A third shaft 3141 is connected to each of the third speed reducers 314. Two opposite ends of each of the second connecting rods 316 are respectively connected to one of the second shaft 3131 and the third shaft 3141 adjacent to the second shaft 3131 without rotation, so that the second shaft 3131 and the adjacent third shaft 3141 rotate synchronously. The second shaft 3131 drives the third shaft 3141 to drive the second nut 3143 to rotate, the second nut 3143 is engaged with the screw rod 317 for transmission. So that the bearing part 33 is driven to be elevated or lowered by the screw rods 317.

The rotating driver 311 drives the first shafts 3121, the second shafts 3131, the third shafts 3141, the first nuts 3133, and the second nuts 3143 to rotate synchronously through the first speed reducer 312, the second speed reducers 313, and the third speed reducers 314, so that all of the screw rods 317 are driven to be transmitted synchronously by the first nuts 3133 and the second nuts 3143. The bearing part 33 is elevated or lowered steadily, and the problem of deflection of the bearing part 33 is avoided.

In at least one embodiment, the first speed reducer 312 may be located on a side of the bearing part 33 intersecting the entrance 101.

In at least one embodiment, the rotating driver 311 may be a motor, the first speed reducer 312 may be a gear box, each of the second speed reducer 313 and the third speed reducer 314 may be a screw reducer. In another embodiment, the rotating driver 311 may be a rotating air cylinder.

In at least one embodiment, the lifting mechanism 30 may be a ballscrew module.

In at least one embodiment, in the lifting driving member 31, the number of the second speed reducers 313, the number of the first connecting rods 315, and the number of the screw rods 317 may be one respectively, and the third speed reducer 314 may be omitted. The first shaft 3121 of the first speed reducer 312 drives the first connecting rod 315 and the second shaft 3131 of the second speed reducer 313 to rotate, so that the second nut 3143 of the second speed reducer 313 rotates to drive the screw rod 317 to move. The screw rod 317 drives the bearing part 33 to move, thereby achieving the function of the lifting driving member 31 to drive the bearing part 33 to be elevated or lowered.

Figure 6:
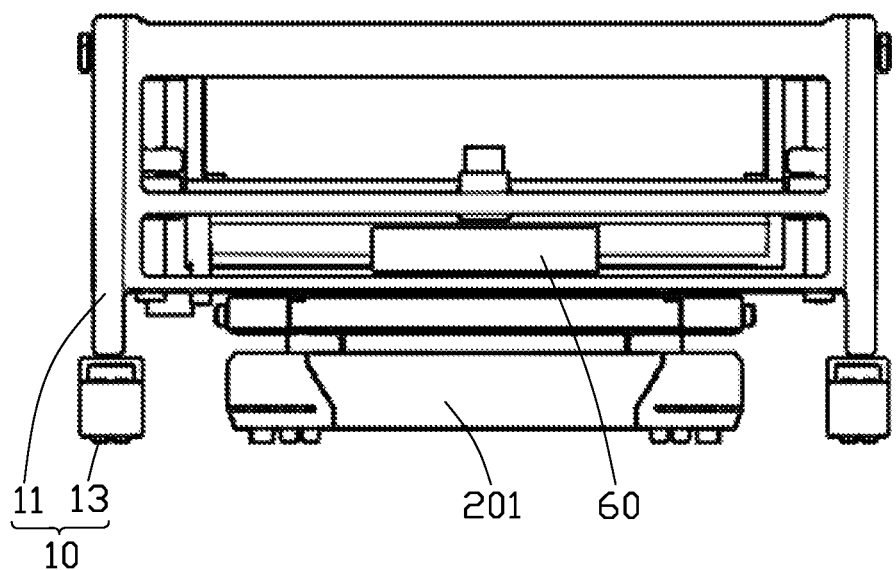
FIG. 6 is a structural schematic diagram of the mobile lifting conveyor of FIG. 1 from a third perspective.

Referring to FIG. 6, the supporting mechanism 10 may include a supporting main body 11 and a plurality of the wheels 13. The supporting main body 11 is connected to the mobile robot 201. The plurality of the wheels 13 are installed at the bottom of the supporting main body 11 and share a force of the mobile robot 201 to carry the carrier 100, thereby improving the stability of the movement of the mobile lifting conveyor 200. In another embodiment, the plurality of the wheels 13 may be omitted.

Referring to FIG. 4, a plurality of connecting holes 103 are formed on the supporting main body 11. Part of the plurality of connecting holes 103 are connected with the mobile robot 201 through fasteners 203. The diameters of the connecting holes 103 and a space between two connecting holes 103 may be designed to be different, so that the supporting mechanism 10 can be connected to different mobile robots 201 through the fasteners 203, thereby increasing the universalization of the carrier 100.

In at least one embodiment, the supporting mechanism 10 may be connected to the mobile robot 201 through a connecting member (not shown). The connecting member may be buckled with the supporting mechanism 10 and the mobile robot 201 respectively.

Referring to FIG. 4, the lifting mechanism 30 may further include a plurality of guiding members 80 providing guidance for the lifting of the bearing part 33. Each guiding member 80 includes a guiding rod 81 and a guiding block 83. The guiding block 83 is arranged on the supporting mechanism 10. A guiding hole 831 is formed on the guiding block 83, and the guiding rod 81 passes through the guiding hole 831 and moves along the guiding hole 831. In another embodiment, the plurality of guiding members 80 may be omitted.

Referring to FIG. 1, the carrier 100 may further include two lead-in parts 90 arranged on the bearing part 33 and located above the plurality of the rollers 333. Each lead-in part 90 includes a guiding surface 91 facing the entrance 101. In at least one embodiment, the guiding surface 91 may be an inclined plane. In another embodiment, the guiding surface 91 may be a curved surface.

Referring to FIG. 2, the carrier 100 may further include at least one emergency stop button 105. In at least one embodiment, the carrier 100 includes four emergency stop buttons 105. The emergency stop buttons 105 are arranged on the supporting mechanism 10 and are located outside of the supporting mechanism 10. The emergency stop buttons 105 may improve the safety of the carrier 100.

In another embodiment, the carrier 100 may not cooperate with the mobile robot 201. The carrier 100 with the goods 400 may be manually transported between the transportation point and destination.

The above-mentioned carrier 100 is installed on the mobile robot 201 through the supporting mechanism 10, so that the mobile robot 201 may drive the carrier 100 to move. The carrier 100 acquires information of height of platform 300 for placing the goods 400 by the first detection component 40 and feeds the height back to the controller 60. The controller 60 controls the lifting driving member 31 to drive the bearing part 33 to be elevated by an appropriate displacement from the original position, so that the goods 400 may be transferred smoothly between the bearing part 33 and the platform 300. After the transfer is completed, the controller 60 controls the lifting driving member 31 to drive the bearing part 33 to back to the original position. The lifting driving member 31 can drive the bearing part 33 to move different displacements to adapt to the loading of the goods 400 placed on the platforms 300 at different heights without using a stacker (not shown), so that the goods 400 are automatically moved.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A carrier for transporting goods comprising:
a supporting mechanism comprising at least one entrance and connected to a mobile robot;
a lifting mechanism comprising a lifting driving member and a bearing part, wherein the lifting driving member is arranged on the supporting mechanism, the bearing part is arranged on the lifting driving member, and the lifting driving member is configured to elevate or lower the bearing part;
a first detection component arranged on the bearing part and located in front of the at least one entrance for detecting a position of the goods; and
a controller arranged on the supporting mechanism and communicatively connected with each of the lifting driving member, the first detection component, and the mobile robot, respectively;
wherein the lifting driving member comprises a rotating driver, a first speed reducer, a second speed reducer, a first connecting rod, and a first screw rod, wherein the first speed reducer and the second speed reducer are arranged on the supporting mechanism at intervals and are located on a peripheral side of the bearing part, a first shaft is disposed on the first speed reducer, the rotating driver is connected to the first speed reducer and drives the first shaft to rotate; the first screw rod is disposed on the bearing part and is screwed to the second speed reducer, a second shaft is disposed on the second speed reducer, and two opposite ends of the first connecting rod are respectively connected to the first shaft and the second shaft without rotation.

2. The carrier of claim 1, wherein the carrier further comprises a second detection component, the second detection component comprises a first sensing element and a second sensing element, the first sensing element and the second sensing element are arranged at intervals on the bearing part, the first sensing element is located on a side of the second sensing element away from the entrance, the first sensing element communicates with the controller and feeds back a signal that the first sensing element is in contact with the goods to the controller, the second sensing element communicates with the controller and feeds back a signal that the second sensing element is separated from the goods to the controller.

3. The carrier of claim 1, wherein the carrier further comprises a protection mechanism comprising a moving driver and a stopper, wherein the moving driver is arranged on the bearing part and is communicatively connected with the controller, the stopper is arranged on the moving driver and is located on a side of the bearing part facing the entrance, and the stopper is driven to be elevated or lowered by the moving driver.

4. The carrier of claim 1, wherein the bearing part comprises a carrying main body, a conveying driving member, and a plurality of rollers, wherein the plurality of rollers are rotatably carried on the carrying main body and are connected with the conveying driving member, and the conveying driving member is disposed on the carrying main body and drives the plurality of rollers to roll.

5. The carrier of claim 1, wherein a plurality of connecting holes are on the supporting mechanism, and the plurality of connecting holes are connected with the mobile robot through fasteners.

6. The carrier of claim 1, wherein the lifting driving member further comprises a third speed reducer, a second connecting rod, and a second screw rod, wherein the third speed reducer is arranged on the supporting mechanism and is located on a peripheral side of the bearing part, the third speed reducer is spaced from the first speed reducer and the second speed reducer, the second screw rod is disposed on the bearing part and is screwed to the third speed reducer, a third shaft is disposed on the third speed reducer, and two opposite ends of the second connecting rod are respectively connected to the third shaft and the third shaft without rotation.

7. The carrier of claim 1, wherein the supporting mechanism comprises a supporting main body and a plurality of the wheels, the supporting main body is connected to the mobile robot, the plurality of the wheels are installed at a bottom of the supporting main body.

8. The carrier of claim 1, wherein the carrier further comprises at least one emergency stop button arranged on the supporting mechanism and located outside of the supporting mechanism.

9. A mobile lifting conveyor for transporting goods, the mobile lifting conveyor comprising a carrier and a mobile robot, the carrier being arranged on the mobile robot and comprising:
 a supporting mechanism comprising at least one entrance and connected to the mobile robot;
 a lifting mechanism comprising a lifting driving member and a bearing part, wherein the lifting driving member is arranged on the supporting mechanism, and the bearing part is arranged on the lifting driving member to be elevated or lowered by the lifting driving member;
 a first detection component arranged on the bearing part and located in front of the at least one entrance for detecting a position of the goods; and
 a controller arranged on the supporting mechanism and communicatively connected with each of lifting driving member, the first detection component, and the mobile robot, respectively;
 wherein the lifting driving member comprises a rotating driver, a first speed reducer, a second speed reducer, a first connecting rod, and a first screw rod, wherein the first speed reducer and the second speed reducer are arranged on the supporting mechanism at intervals and are located on a peripheral side of the bearing part, a first shaft is disposed on the first speed reducer, the rotating driver is connected to the first speed reducer and drives the first shaft to rotate; the first screw rod is disposed on the bearing part and is screwed to the second speed reducer, a second shaft is disposed on the second speed reducer, and two opposite ends of the first connecting rod are respectively connected to the first shaft and the second shaft without rotation.

10. The mobile lifting conveyor of claim 9, wherein the carrier further comprises a second detection component, the second detection component comprises a first sensing element and a second sensing element, the first sensing element and the second sensing element are arranged at intervals on the bearing part, the first sensing element is located on a side of the second sensing element away from the entrance, the first sensing element communicates with the controller and feeds back a signal that the first sensing element is in contact with the goods to the controller, the second sensing element communicates with the controller and feeds back a signal that the second sensing element is separated from the goods to the controller.

11. The mobile lifting conveyor of claim 9, wherein the carrier further comprises a protection mechanism comprising a moving driver and a stopper, wherein the moving driver is arranged on the bearing part and is communicatively connected with the controller, the stopper is arranged on the moving driver and is located on a side of the bearing part facing the entrance, and the stopper is driven to be elevated or lowered by the moving driver.

12. The mobile lifting conveyor of claim 9, wherein the bearing part comprises a carrying main body, a conveying driving member, and a plurality of rollers, wherein the plurality of rollers are rotatably carried on the carrying main body and are connected with the conveying driving member, and the conveying driving member is disposed on the carrying main body and drives the plurality of rollers to roll.

13. The mobile lifting conveyor of claim 9, wherein a plurality of connecting holes are on the supporting mechanism, and the plurality of connecting holes are connected with the mobile robot through fasteners.

14. The mobile lifting conveyor of claim 9, wherein the lifting driving member further comprises a third speed reducer, a second connecting rod, and a second screw rod, wherein the third speed reducer is arranged on the supporting mechanism and is located on a peripheral side of the bearing part, the third speed reducer is spaced from the first speed reducer and the second speed reducer, the second screw rod is disposed on the bearing part and is screwed to the third speed reducer, a third shaft is disposed on the third speed reducer, and two opposite ends of the second connecting rod are respectively connected to the third shaft and the third shaft without rotation.

15. The mobile lifting conveyor of claim 9, wherein the supporting mechanism comprises a supporting main body and a plurality of the wheels, the supporting main body is connected to the mobile robot, the plurality of the wheels are installed at a bottom of the supporting main body.

16. The mobile lifting conveyor of claim 9, wherein the carrier further comprises at least one emergency stop button arranged on the supporting mechanism and located outside of the supporting mechanism.

* * * * *